(12) United States Patent
Iyer et al.

(10) Patent No.: US 8,576,793 B2
(45) Date of Patent: *Nov. 5, 2013

(54) COEXISTENCE MANAGEMENT FOR COOPERATIVE TRANSCEIVING IN A SHARED SPECTRUM

(75) Inventors: Mahesh Iyer, Sunnyvale, CA (US); Raymond R. Hayes, Los Gatos, CA (US)

(73) Assignee: Broadcom Corporation, Irvine, CA (US)

(*) Notice: Subject to any disclaimer, the term of this patent is extended or adjusted under 35 U.S.C. 154(b) by 166 days.

This patent is subject to a terminal disclaimer.

(21) Appl. No.: 13/153,111

(22) Filed: Jun. 3, 2011

(65) Prior Publication Data

US 2011/0235511 A1    Sep. 29, 2011

Related U.S. Application Data

(63) Continuation of application No. 12/117,323, filed on May 8, 2008, now Pat. No. 7,983,216.

(60) Provisional application No. 60/932,852, filed on May 31, 2007.

(51) Int. Cl.
   *H04W 4/00* (2009.01)
   *H04B 7/00* (2006.01)

(52) U.S. Cl.
   USPC ............................. 370/329; 370/338; 370/341

(58) Field of Classification Search
   None
   See application file for complete search history.

(56) References Cited

U.S. PATENT DOCUMENTS

| 7,590,101 | B2 * | 9/2009 | Forand et al. | 370/350 |
| 7,653,035 | B2 * | 1/2010 | Lin et al. | 370/338 |
| 7,809,375 | B2 * | 10/2010 | Thermond | 455/442 |
| 7,826,408 | B1 * | 11/2010 | Vleugels et al. | 370/328 |
| 7,983,216 | B2 * | 7/2011 | Iyer et al. | 370/329 |
| 2004/0253984 | A1 * | 12/2004 | Csapo et al. | 455/561 |
| 2006/0233191 | A1 * | 10/2006 | Pirzada et al. | 370/463 |
| 2007/0066359 | A1 * | 3/2007 | Zhuang | 455/557 |
| 2008/0291886 | A1 * | 11/2008 | Thermond | 370/338 |

\* cited by examiner

*Primary Examiner* — Chi Pham
*Assistant Examiner* — Soon-Dong D Hyun
(74) *Attorney, Agent, or Firm* — Garlick & Markison; Bruce E. Stuckman (57) ABSTRACT

A wireless interface circuit transceives packetized data between a host module and a first external device using a frequency spectrum, wherein the packetized data is formatted in accordance with a first wireless communication protocol and wherein the packetized data includes an indication that the first external device is configured to use at least a portion of the frequency spectrum for communication via a second wireless communication protocol. A coexistence management module generates a wireless interface schedule that includes a least one contention free period reserved for communication via the second wireless communication protocol, and generates schedule data, based on the wireless interface schedule, for transmission to a plurality of external devices including the first external device.

20 Claims, 8 Drawing Sheets

FIG. 5
antenna section 61

COEXISTENCE MANAGEMENT FOR COOPERATIVE TRANSCEIVING IN A SHARED SPECTRUM

CROSS-REFERENCE TO RELATED APPLICATIONS

The present application claims priority under 35 U.S.C. 120 to the copending application Ser. No. 12/117,323, entitled, "COEXISTENCE MANAGEMENT FOR COOPERATIVE TRANSCEIVING IN A SHARED SPECTRUM,", filed on May 8, 2008 that itself claims priority under 35 U.S.C. 119 to provisionally filed application Ser. No. 60/932,852, entitled, "COEXISTENCE MANAGEMENT FOR COOPERATIVE TRANSCEIVING IN A SHARED SPECTRUM," filed on May 31, 2007, the contents of which are incorporated herein by reference thereto.

BACKGROUND OF THE INVENTION

1. Technical Field of the Invention

This invention relates generally to wireless communication systems and more particularly to cooperative transceiving by wireless interface devices of the same host device.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etcetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier (PA). The data modulation stage converts raw data into baseband signals in accordance with a particular wireless communication standard. The one or more intermediate frequency stages mix the baseband signals with one or more local oscillations to produce RF signals. The PA amplifies the RF signals prior to transmission via an antenna.

As is also known, the receiver is coupled to the antenna and includes a low noise amplifier (LNA), one or more intermediate frequency stages, a filtering stage, and a data recovery stage. The LNA receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The 2.4 GHz industrial, scientific and medical (ISM) band is experiencing unprecedented growth due mostly to strong showing of two wireless technologies: wireless local area networking (WLAN) and wireless personal area networking (WPAN). WLAN operates in the 100+ meters range and is usually used to augment traditional wired networking by providing wireless connectivity in the home, office or public areas. WLAN devices operate in accordance with IEEE 802.11 standards (e.g., 802.11b, 802.11g and 802.11n) and can offer data rates in excess of 100 Mbps. In recent years as voice over IP (VoIP) has found wider adoption for carrying telephone traffic, various new concepts such as Unlicensed Mobile Access (UMA) have been using WLAN as a technology of choice for the wireless terminals.

WPAN technology is led by Bluetooth which was designed as a cable replacement technology to provide device interconnection in the radius of approximately 10 meters. A Bluetooth network is organized as a piconet with a single master device and a number of slave devices which are only allowed to communicate with the master. In this scheme, a single slave device selected by the master may transmit while others must wait for their turn. The Bluetooth physical layer (PHY) uses frequency hopping spread spectrum (FHSS) technology. At any point in time, a Bluetooth signal occupies just 1 MHz of bandwidth but the center frequency changes up to 1600 times per second. The frequency change (hopping) pattern is selected by the piconet master such that the interference between different piconets is minimized. A time-division duplex (TDD) technique is used to transmit and receive data in a piconet. Access to the transmission channel is divided into 625 μs slots. The Piconet master transmits during even-numbered slots while the slave devices transmit during odd-numbered slots. The Bluetooth specification also allows multislot transmissions where packets occupy multiple consecutive slots (three or five). A slave must respond to the master's packet addressed to it. If it has no data it must respond with a NULL packet. The Bluetooth specification defines the following types of links for the support of voice and data applications: synchronous connection-oriented (SCO), extended synchronous (eSCO) and asynchronous connectionless (ACL). SCO and eSCO links are typically used for transmitting real-time voice and multimedia packets while ACL is most often used for non-real time data traffic. SCO packets do not have cyclic redundancy check (CRC) protection and are never retransmitted. eSCO and ACL packets use CRC and errors are corrected by packet retransmission. The most typical Bluetooth application is found in wireless headsets.

WLAN technologies are led by IEEE 802.11 which defines two different ways to configure a wireless network: ad hoc mode and infrastructure mode. In ad hoc mode, mobile nodes are brought together to form a network and communicate directly as needed, whereas infrastructure mode uses fixed access points through which the mobile nodes can communicate. These network access points are usually connected to wired networks through bridging or routing functions.

The IEEE 802.11 medium access control (MAC) layer is a contention-resolution protocol that is responsible for maintaining order in the use of a shared wireless medium. IEEE 802.11 specifies both contention-based and contention-free channel access mechanisms. The contention-based scheme is also called the distributed coordination function (DCF) and the contention free scheme is also called the point coordination function (PCF). The DCF employs a carrier sense multiple access with collision avoidance (CSMA/CA) protocol. In this protocol, when the IEEE 802.11 MAC receives a packet to be transmitted from its higher layer, the MAC first listens to ensure that no other node is transmitting. If the channel is clear, it then transmits the packet. Otherwise, it chooses a random backoff factor that determines the amount of time the node must wait until it is allowed to transmit its packet. During periods in which the channel is clear, the IEEE 802.11 MAC waiting to transmit decrements its backoff counter, and when the channel is busy, it does not decrement its backoff counter. When the backoff counter reaches zero, the IEEE 802.11 MAC transmits the packet. Because the probability that two nodes will choose the same backoff factor is low, collisions between packets are minimized. Collision detection, as employed in Ethernet, cannot be used for the radio frequency transmissions of IEEE 802.11 devices. IEEE 802.11 nodes are half-duplex-when a node is transmitting, it cannot hear any other node in the system that is transmitting because its own signal drowns out any others arriving at the node.

Optionally, when a packet is to be transmitted, the transmitting node can first send out a short request to send (RTS) packet containing information on the length of the packet. If the receiving node hears the RTS, it responds with a short clear to send (CTS) packet. After this exchange, the transmitting node sends its packet.

If the packet is addressed to a single recipient (directed packet) and is received successfully, as determined by a cyclic redundancy check (CRC), the receiving node transmits an acknowledgment (ACK) packet. If the transmitting node does not receive an ACK for the directed packet it assumes that the packet transmission had failed and error recovery is attempted by retrying the original packet. Retries are continued until either the ACK packet is received or the retry limit is reached. In the later case the packet can be retried at a lower data rate and if that fails the packet is discarded.

To maintain a reliable data connection at the highest possible data rate a WLAN transmitter usually employs a dynamic rate adaptation algorithm. Such an algorithm reduces the data rate for wireless communication when the number of unsuccessful attempts to transmit a packet reaches a certain threshold. In an environment where the thermal noise is the only source of receive errors, this algorithm converges to the highest data rate supported by the wireless link. However, for the cases where transmission failed due to the interference from a WPAN transceiver collocated with the receiving node this rate adaptation algorithm would result in lowering the data rate, increasing the packet transmission time and thus further increasing the probability of the interference errors. Lowering the rate increases the probability of losing packets due to congestion, thereby lowering performance.

When a packet is lost the overall network performance is affected. The impact is dependent on the type of packets. Discarding directed frames might result in poor voice quality in a VoIP link or lower TCP throughput. If a wireless station fails to receive non-unicast packets, it might result in the failure of protocols such as ARP and DHCP. Losing beacon frames might result in loss of synchronization to the wireless network.

As WLAN and WPAN are designed for different uses they often complement each other in personal computers and mobile devices such as phones and personal digital assistants. And while these two wireless systems use different technologies, they operate in the same 2.4 GHz ISM band, and as a result, can interfere with each other. Such interference might cause degraded data throughput, reduced voice quality or even link disconnection.

The interference between WLAN and WPAN networks can be divided into two classes. The interference is said to be external if the interfering devices are physically separated by a distance of more than two meters. The interference is said to be internal if the devices are located at a distance of less than two meters and devices are said to be collocated. The internal interference is much more severe as each wireless transceiver has drastic impact on the performance of the other, as it's transmit/receive activity may saturate the LNA of the other device.

The mutual interference between WPAN and WLAN depends on several factors. The physical distance between WPAN and WLAN, the operating data rate, operating transmit power levels and amount of data all affect the interference. To address the problem of mutual interference between IEEE 802.11 and Bluetooth technologies, the IEEE has developed 802.15.2 Recommended Practice that offers several coexistence mechanisms to enable IEEE 802.11 and Bluetooth to operate in a shared environment without adversely affecting each others' performance. The IEEE 802.15.2 Recommended Practice categorizes coexistence mechanisms into two classes: collaborative and non-collaborative. The former is applicable to collocated IEEE 802.11 and Bluetooth devices and requires exchange of information between these two devices, while the latter does not require information sharing.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

The following abbreviations are presented for clarity:

| | |
|---|---|
| A2DP | Advanced Audio Distribution Profile |
| AP | Access Point |
| ACK | Acknowledgement |
| ACL | Asynchronous Connectionless |
| AFH | Adaptive Frequency Hopping |
| BT | Bluetooth |
| BSS | Basic Service Set |
| CRC | Cyclic Redundancy Check |
| CSMA/CA | Carrier Sense Multiple Access with Collision Avoidance |
| CTS | Clear To Send |
| DCF | Distributed Coordination Function |
| eSCO | Enhanced Synchronous Connection Oriented |
| FHSS | Frequency Hopping Spread Spectrum |
| ISM | Industrial, Scientific and Medical |
| LNA | Low Noise Amplifier |
| MAC | Medium Access Control |
| NAV | Network Allocation Vector |
| PA | Power Amplifier |
| PCF | Point Coordination Function |
| PHY | Physical layer |
| PTA | Packet Transmit Arbitration |
| RTS | Request To Send |
| RX | Receive |
| SCO | Synchronous Connection Oriented |
| STA | Station |
| TDD | Time-Division Duplex |
| TSF | Timing Synchronization Function |
| TX | Transmit |
| UMA | Unlicensed Mobile Access |
| VoIP | Voice over IP |
| WLAN | Wireless Local Area Network |
| WPAN | Wireless Personal Area Network |

Figure 1:
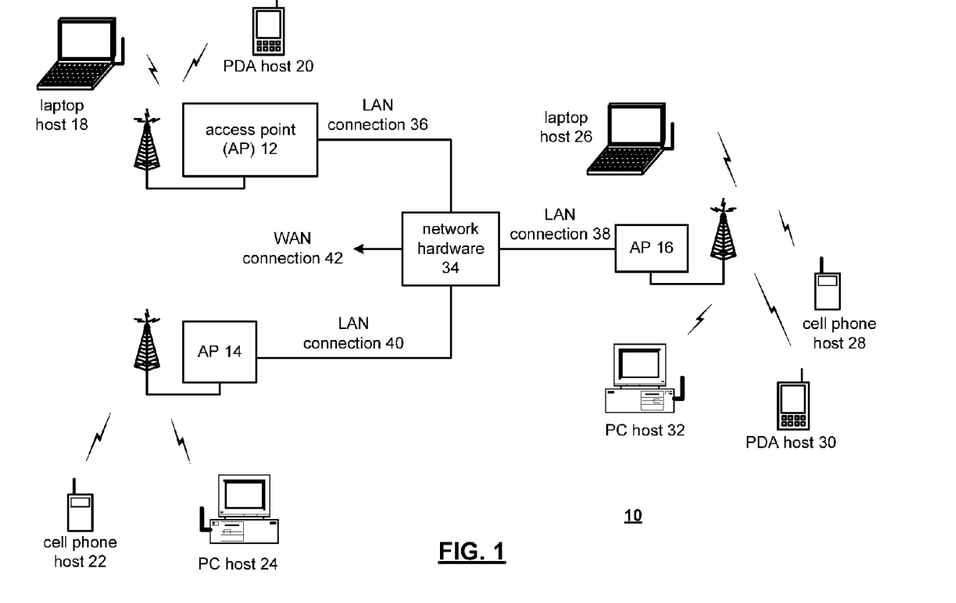
FIG. 1 is a schematic block diagram of an exemplary wireless communication system in accordance with the present invention.

FIG. 1 is a schematic block diagram illustrating a communication system 10 that includes a plurality of access points 12-16, a plurality of wireless communication devices 18-32 and a network hardware component 34 (for example, a bridge, switch or router). The wireless communication devices 18-32 may be laptop host computers 18 and 26, personal digital assistant hosts 20 and 30, personal computer hosts 24 and 32, cellular telephone hosts 22 and 28 and/or other wireless devices.

The access points 12-16 are operably coupled to the network hardware 34 via local area network connections 36, 38 and 40. The network hardware 34, which may be a router, switch, bridge, modem, system controller, etcetera, provides a wide area network connection 42 for the communication system 10. Each of the access points 12-16 has an associated antenna or antenna array to communicate with the wireless communication devices in its area. Typically, the wireless communication devices register with a particular access point 12-14 to receive services from the communication system 10. For direct connections (i.e., point-to-point communications), wireless communication devices communicate directly via agreed upon frequencies.

Typically, access points 12-16 are used for in-home or in-building wireless networks however base stations can similarly be employed, for instance, for cellular telephone systems and like-type systems. Regardless of the particular type of communication system, each wireless communication device includes a built-in radio and/or is coupled to a radio.

In an embodiment of the present invention, one or more of the communication devices 18, 20, 22, 24, 26, 28, 30 and 32 operate over an additional wireless network, such as a wireless personal area network, that shares the same spectrum or otherwise could potentially interfere with wireless communication between the access points 12, 14 and 16 and the wireless communication devices 18, 20, 22, 24, 26, 28, 30 and 32. For example, the access points 12, 14 and 16 could operate in accordance with a wireless local area network protocol such as an IEEE 802.11 protocol and one or more wireless communication devices 18, 20, 22, 24, 26, 28, 30 and 32 could operate using Bluetooth. In this case, IEEE 802.11 and Bluetooth communications could both use the 2.4 GHz frequency band. For instance, the laptop host 18 may communicate via Bluetooth technology with a keyboard, a mouse, a printer, a mobile phone, a PDA, and/or a set of headphones or speakers, where these devices and the laptop host 18 may form an ad-hoc Bluetooth piconet. Generally, a Bluetooth piconet may comprise a master device or terminal and up to seven slave devices or terminals. In this exemplary implementation, the laptop host 18 may correspond to the master Bluetooth terminal and be coupled to one or more the peripheral devices, such as a headset, printer, keyboard, pointing device or other peripheral devices that may correspond to the slave Bluetooth terminals. Similarly, cell phone host 22 could communicate via Bluetooth technology with a Bluetooth headset and place wireless telephone calls via a wireless IP telephone calls via an access point or base station.

The wireless communication devices 12, 14, 16, 18, 20, 22, 24, 26, 28, 30 and/or 32 can include one or more features of the present invention addressing coexistence issues that will be described in greater detail with reference to FIGS. 2-10.

Figure 2:
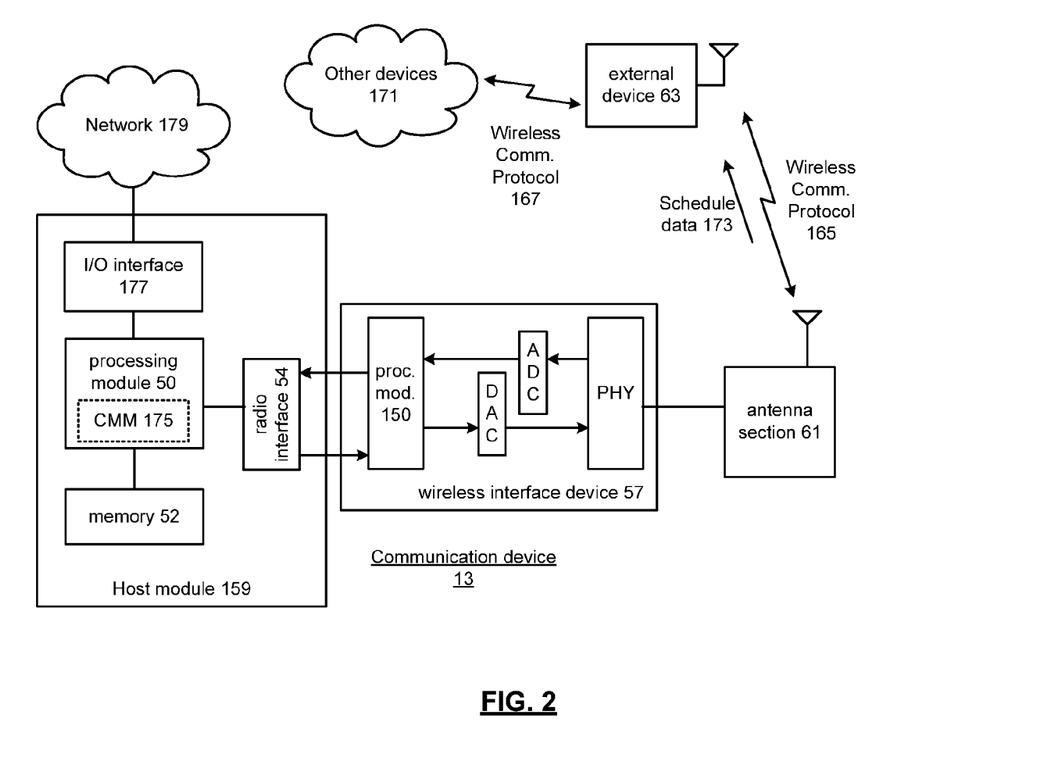
FIG. 2 is a schematic block diagram of an exemplary wireless communication device 13 in accordance with an embodiment of the present invention.

FIG. 2 is a schematic block diagram illustrating a wireless communication device 13, such as AP 12, 14 or 16, that includes the host module 159 and at least one wireless interface device, or radio transceivers 57. The wireless interface device can be a wireless interface circuit with a single integrated circuit, or built in components of the host module 159, externally coupled components or part of a common integrated circuit that includes host module 159 and wireless interface device 57. As illustrated, the host module 159 includes a processing module 50, memory 52, and radio interface 54. The processing module 50 and memory 52 execute the corresponding instructions that are typically performed by the AP 12, 14 and/or 16. For example, for a cellular telephone base station, or WLAN access point, the processing module 50 performs the corresponding communication functions in accordance with a particular cellular telephone or WLAN standard.

The radio interface 54 communicates with the processing module 150 of the wireless interface device 57. This processing module includes a media-specific access control protocol (MAC) layer module and other processing functionality to support the features and functions of the particular wireless protocol employed by the wireless interface device and further to perform additional functions and features of the present invention as described herein. The processing modules 50 and 150 may be implemented using a shared processing device, individual processing devices, or a plurality of processing devices.

The wireless interface device 57 further includes a digital-to-analog converter (DAC), an analog to digital converter (ADC), and a physical layer module (PHY). The radio interface 54 allows data to be received from and sent to one or more external devices 63 via the wireless interface device 57. Each of the external devices includes its own wireless interface device for communicating with the wireless interface device of the communication device 13. For data received from the wireless interface device 57 (e.g., inbound data), the radio interface 54 provides the data to the processing module 50 for further processing and routing to the input/output (I/O) interface 177. The I/O interface 177 provides connectivity to network 179, such as a WAN or LAN. The radio interface 54 also provides data from the processing module 50, either internally generated or passed through from the LAN or WAN via I/O interface 177, to the wireless interface device 57. For data received via the I/O interface 177, the processing module 50 may perform a corresponding host function on the data and/or route it to the wireless interface device 57 via the radio interface 54.

In an embodiment of the present invention, processing module 50 includes a coexistence management module (CMM) 175 that operates to manage coexistence issues that arise from the presence of other wireless devices that operate via other wireless communication protocols over a common frequency spectrum used by wireless interface device 57 or other potentially interfering spectrum.

In one mode of operation, wireless interface device 57 transceives packetized data between a host module 159 and the external device 63 using a frequency spectrum, wherein the packetized data is formatted in accordance with a wireless communication protocol 165 and wherein the packetized data includes a request from the external device 63 to use at least a portion of the frequency spectrum for communication via a wireless communication protocol 167 used to communicate with other devices 171. It should be noted that the request may be in the form of an indication that communication with the devices (171) is in progress or desired. External device 63 can be a host device 18, 20, 22, 24, 26, 28, 30 or 32 that communicates via a WPAN with a headset, microphone, keyboard, printer or other device. Coexistence management module 175 generates a wireless interface schedule that includes a least one contention free period reserved for communication via the wireless communication protocol 167, and generates schedule data 173, based on the wireless interface schedule, for transmission to a plurality of external devices including the external device 63.

In an embodiment of the present invention, the coexistence management module 175 generates schedule data 173 for transmission to the plurality of external devices in a header data portion or other control data portion of the packetized data, and/or in a payload portion of the packetized data. The schedule data 173 instructs the plurality of external devices not to transmit via the wireless communication protocol 165 during the contention free period. The schedule data 173 can include timing data such as a timing synchronization function (TSF) or other timing information that establishes a common time reference on a network-wide basis between the communication device 13 and the external devices in communication with the communication device 13 via wireless communication protocol 165. Further the schedule data 173 can be used to construct a network allocation vector (NAV) that establishes the beginning, duration and/or ending of the contention free period. The external device and other devices communicating with the communication device 13 via wireless communication protocol 165 receive and read the schedule data 173 and, per the application to their own MAC layer processing, refrain from transmitting via wireless communication protocol 165 during the contention free period that has been established by communication device 13.

In this fashion, external device 63 can request communication device 13 to reserve time for communications via the wireless communication protocol 167 to communicate with other devices 171. In response, communication device 13 can set aside a contention free period for network communication between communication device 13 and other external devices (including external device 63) so that these devices will not transmit during this period via wireless communication protocol 165, thereby preventing collisions between the different protocols sharing the same spectrum or otherwise interfering with each other.

Processing module 50 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 52 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 50 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 3:
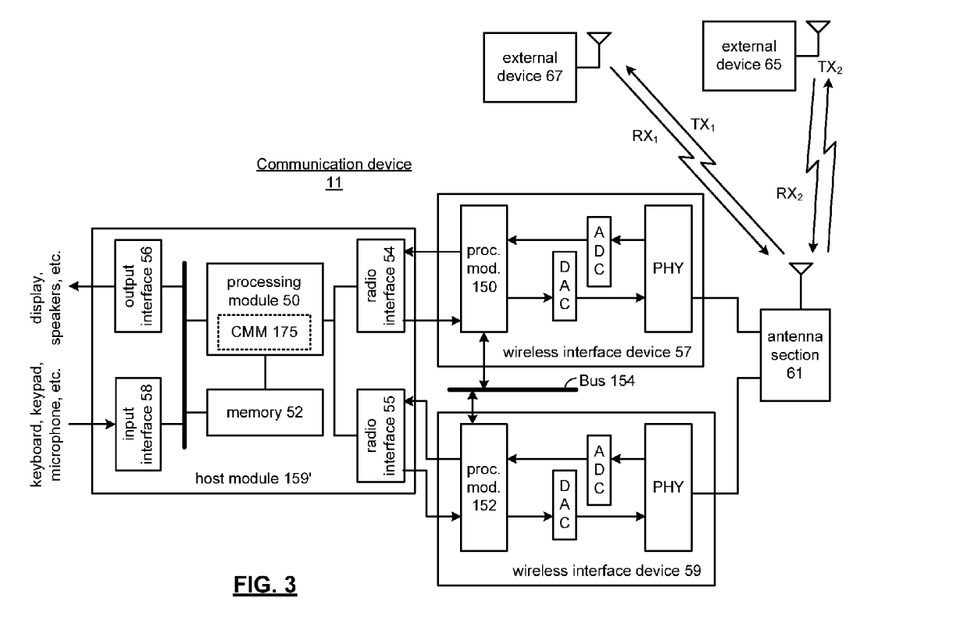
FIG. 3 is a schematic block diagram of an exemplary wireless communication device 11 in accordance with an embodiment of the present invention.

FIG. 3 is a schematic block diagram illustrating a wireless communication device 11, such as host device 18, 20, 22, 24, 26, 28, 30 and/or 32 (18-32) that includes the host module 159' and at least two wireless interface devices, or radio transceivers, 57 and 59. The wireless interface devices can be wireless interface circuits that are implemented separately or with a single integrated circuits, built in components of the host module, externally coupled components or part of a common integrated circuit that includes host module 159' and wireless interface devices 57 & 59. As illustrated, the host module 159' includes a processing module 50, memory 52, radio interfaces 54 and 55, input interface 58 and output interface 56. The processing module 50 and memory 52 execute the corresponding instructions that are typically performed by the host device. For example, for a cellular telephone or WLAN node the processing module 50 performs the corresponding communication functions in accordance with a particular cellular telephone or WLAN standard.

The radio interfaces 54 and 55 each communicate with a processing module 150 or 152 of the corresponding wireless interface device 57 or 59. These processing modules include a media-specific access control protocol (MAC) layer module and other processing functionality to support the features and functions of the particular wireless protocol employed by the wireless interface device and further to perform additional functions and features of the present invention as described herein. The processing modules 150 and 152 may be implemented using a shared processing device, individual processing devices, or a plurality of processing devices.

The wireless interface devices 57 and 59 further include a digital-to-analog converter (DAC), an analog to digital converter (ADC), and a physical layer module (PHY). The radio interfaces 54 and 55 allow data to be received from and sent to external devices 67 and 65 via the wireless interface devices 57 and 59. Each of the external devices includes its own wireless interface device for communicating with the wireless interface device of the host device. For example, the host device may be personal or laptop computer, the external device 65 may be a headset, personal digital assistant, cellular telephone, printer, fax machine, joystick, keyboard, or desktop telephone, and the second external device 67 may be an access point of a wireless local area network. In this example, the external device 65 would include a Bluetooth wireless interface device, external device 67 would include an IEEE 802.11 wireless interface device, and the computer would include both types of wireless interface devices.

For data received from one of the wireless interface devices 57 or 59 (e.g., inbound data), the radio interface 54 or 55 provides the data to the processing module 50 for further processing and/or routing to the output interface 56. The output interface 56 provides connectivity to an output display device such as a display, monitor, speakers, et cetera such that the received data may be displayed. The radio interfaces 54 and 55 also provide data from the processing module 50 to the wireless interface devices 57 and 59. The processing module 50 may receive the outbound data from an input device such as a keyboard, keypad, microphone, etcetera via the input interface 58 or generate the data itself. For data received via the input interface 58, the processing module 50 may perform a corresponding host function on the data and/or route it to one of the wireless interface devices 57 or 59 via the corresponding radio interface 54 or 55.

In operation, to mitigate interference between the two or more wireless interface devices 57 and 59 of the wireless communication device, the processing modules 150 and 152 of each wireless interface device 57 and 59 communicate with each other via a high speed data bus such as bus 154 or other communication path to coordinate their activities. In particular, bus 154 communicates cooperation data between the wireless interface devices 57 and 59, wherein the cooperation data relates to coordinating transceiving in a similar, and/or otherwise interfering or common frequency spectrum.

In a particular embodiment, wireless interface circuit 57 operates in accordance with a WLAN protocol such as IEEE 802.11 and wireless interface circuit 59 operates in accordance with a WPAN protocol such as Bluetooth. The wireless interface circuits 57 and 59 share cooperation data that can include information such as the information provided below:

| Cooperation Data | Description |
| --- | --- |
| Medium Request | Asserted to request to use the medium. |
| Priority status | Signals Bluetooth priority status. |
| Bluetooth transmit | Indicates that Bluetooth has started transmitting data |
| Bluetooth receive | Indicates that Bluetooth has started receiving a valid frame |
| Medium grant | Medium access confirmation; permission to receive or transmit. |
| RF controls | Signals to control various RF switches including antenna switch, shared LNA gain, or other RF control |

In an embodiment of the present invention, a Packet Transmit Arbitration (PTA) operates via the processing module 150 within MAC layer processing. The PTA provides per packet authorization of all transmissions taking place between collocated IEEE 802.11 and Bluetooth devices. Bluetooth device requests medium access authorization from PTA, which may either allow or deny the requests depending on the status of the IEEE 802.11 device. The IEEE 802.11 programs the PTA with one of the following four settings:

PTA grants all Bluetooth medium requests;
  PTA grants high priority Bluetooth requests only. (Priority status is asserted at the time when medium request is asserted);
  PTA grants high and medium priority Bluetooth requests. (Priority status signal is asserted or Bluetooth receive signal is asserted at the time when medium request is asserted);
  PTA does not grant any Bluetooth medium requests.

The PTA setting can be changed dynamically by the IEEE 802.11 processing module 150 device and can be configured to be dependent on the IEEE 802.11 activity at the time of the request.

In an embodiment of the present invention, these signal lines can be bidirectional, particularly when shared coexistence decisions are made between processing modules 150 and 152. As indicated, cooperation data can be shared via bus 154. Alternatively these signals can be provided by other signal paths between the wireless interface devices 57 and 59.

In this embodiment, communication device 11 includes a coexistence management module 175 that operates as described in conjunction with FIG. 2, yet from communication device 11, such as a WLAN station. In a similar fashion to communication device 13, communication device 11 can set aside a contention free period for network communication between communication device 11 and other external devices (including external device 63) so that these devices will not transmit during this period. Further, communication device 11 can set aside a contention free period for itself for communication between itself and external device 65.

Figure 4:
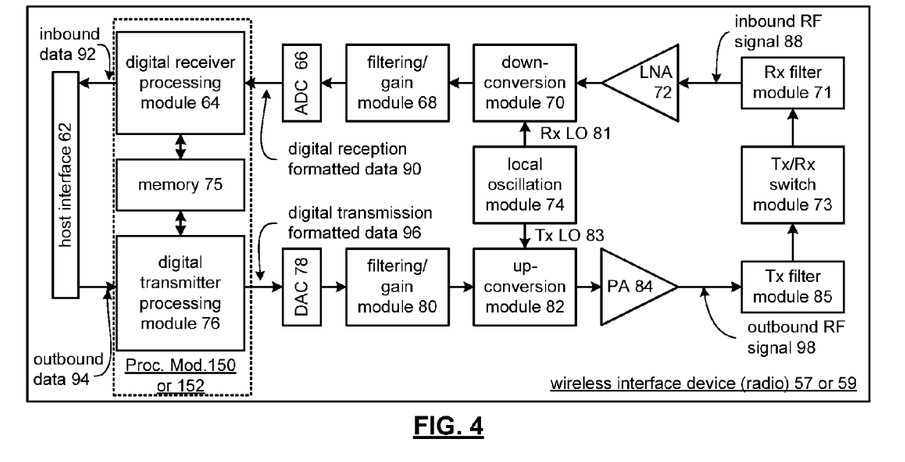
FIG. 4 is a schematic block diagram of an exemplary wireless interface device in accordance with an embodiment of the present invention.
Figure 5:
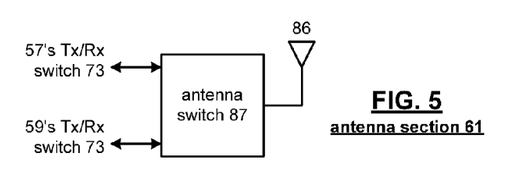
FIG. 5 is a schematic block diagram of an exemplary antenna section in accordance with the present invention.

FIG. 4 is a schematic block diagram of the wireless interface devices (i.e., a radio) 57 or 59, where each device includes a host interface 62, digital receiver processing module 64, an analog-to-digital converter (ADC) 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter (DAC) 78, a filtering/gain module 80, an IF mixing up conversion stage 82, a power amplifier 84, and a transmitter filter module 85. The transmitter/receiver switch 73 is coupled to the antenna section 61, which may include a shared antenna 86 and an antenna switch 87 (as shown in FIG. 5) that is shared by the two wireless interface devices and is further shared by the transmit and receive paths as regulated by the Tx/Rx switch 73. Alternatively, the antenna section 61 may include separate antennas for each wireless interface device, where the transmit path and receive path of each wireless interface device shares an antenna. Still further, the antenna section 61 may include a separate antenna for the transmit path and the receive path of each wireless interface device. As one of average skill in the art will appreciate, the antenna(s) may be polarized, directional, and be physically separated to provide a minimal amount of interference.

Returning to the discussion of FIGS. 2 and 3, the digital receiver processing module 64 the digital transmitter processing module 76, and the memory 75 may be included in the processing module 150 or 152 and execute digital receiver functions and digital transmitter functions in accordance with a particular wireless communication standard. The digital receiver functions can include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the wireless interface device 57 or 59 receives outbound data 94 from the host module via the host interface 62. The host interface 62 routes the outbound data 94 to the digital transmitter processing module 76, which processes the outbound data 94 in accordance with a particular wireless communication standard (e.g., IEEE 802.11 including all current and future subsections, Bluetooth, etcetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna section 61 transmits the outbound RF signal 98 to a targeted device such as a base station, an access point, peripheral and/or another wireless communication device.

The wireless interface device 57 or 59 also receives an inbound RF signal 88 via the antenna section 61, which was transmitted by a base station, an access point, or another wireless communication device. The antenna section 61 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by wireless interface device. The host interface 62 provides the recaptured inbound data 92 to the host device 18-32 via the radio interface 54.

While FIG. 4 shows the wireless interface devices 57 and 59 as being implemented with separate components, one or more modules or components of these devices can be implemented with shared components that operate for both wireless interface devices. For instance, a single LNA 72 and RX filter module 71 can be used by wireless interface devices 57 and 59 to filter and amplify inbound RF signals, a single reference oscillator, such as a crystal oscillator, can be used in local oscillation modules 74 of both wireless interface devices as the basis for generating separate local oscillation signals 81 and 83, etcetera.

Figure 6:
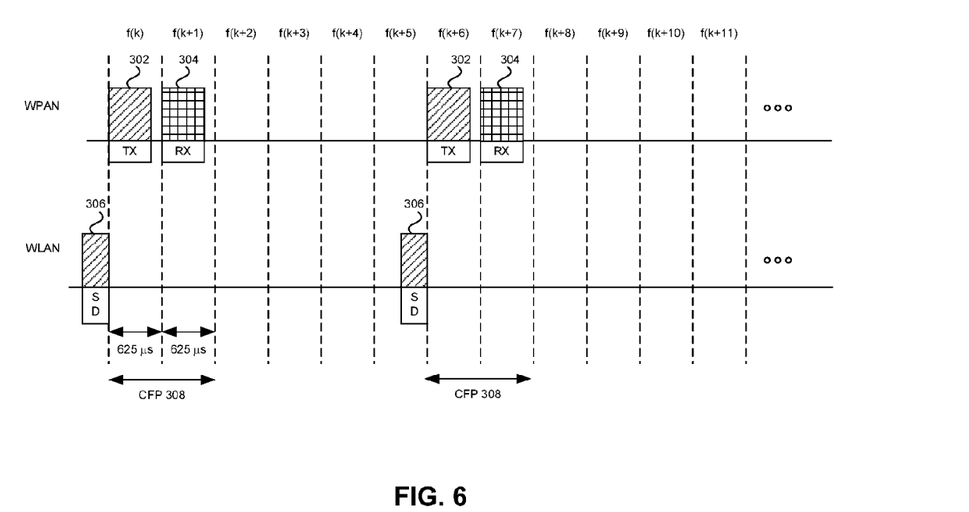
FIG. 6 is a timing diagram that illustrates an exemplary communication of Bluetooth HV3 frames and IEEE 802.11 transmissions, in accordance with an embodiment of the invention.

FIG. 6 is a timing diagram that illustrates an exemplary communication of WPAN transmissions and WLAN transmissions, in accordance with an embodiment of the invention. In this embodiment, the frequency spectrum in use by the communication devices 11 and 13, the external devices 63 and 65 and the other devices 171 must be shared by transmissions sent in accordance with a WLAN protocol such as IEEE 802.11 (b), (g) or (n) or another WLAN protocol in addition to transmissions sent in accordance with a WPAN protocol such as via Bluetooth packets supported by the synchronous connection-oriented (SCO) logical transport protocol, such as Bluetooth (BT) HV3 packets. A BT HV3 packet may be generally used for 64 kb/s speech transmission but need not be so limited. The BT HV3 packet may comprise 30 information bytes with a payload length of 240 bits and no payload header present. The bytes are not protected by forward error correction (FEC) and no cyclic redundancy check (CRC) is present. Because retransmission of BT HV3 packets is not supported, when a BT HV3 packet is not received, the quality of the overall transmission is reduced since the information contained in the lost BT HV3 packet will not be retransmitted. As a result, BT HV3 packets may require a higher priority of transmission to avoid interference with IEEE 802.11 transmission.

The transmission of a pair of BT HV3 packets between a station or terminal such as external device 63 or communication device 11, and a peripheral device is referred to as a BT HV3 frame. In an embodiment of the present invention, the coexistence management module 175 determines a wireless interface schedule in response to a request, such as a request from external device 63 or other indication that WPAN transmissions are desired, that allocates communication to either WPAN or WLAN transmissions during the time slots f(i). In response, the coexistence management module 175 transmits schedule data 306, such as schedule data 163, that establishes a contention free period 308 and allocates slots within the contention free period for use by external device 63 for WPAN transmissions.

For instance BT HV3 packet 302 may be transmitted from the external device 63 to a peripheral device in time slot f(k) and a packet 304 may be transmitted from the peripheral device to the external device 63 in time slot f(k+1). A time slot is 625 μs in duration and may correspond to a different frequency in an adaptive frequency hopping (AFH) hopping sequence. A BT HV3 frame is 1.25 ms in duration. Time slots may be set aside for Bluetooth transmissions at regular intervals such as every sixth time slot or every third BT HV3 frame for transmission of BT HV3 packets to and from external device 63. For example, a first packet may be transmitted from the external device 63 during time slot f(k) and a next packet may be transmitted from the external device 63 during time slot f(k+6). Similarly, a first packet may be received by the external device 63 during time slot f(k+1) and a next packet may be received by the external device during time slot f(k+7). As a result, no Bluetooth communication occurs over a period of two BT HV3 frames providing an IEEE 802.11 transmission window of 2.5 ms.

It should be noted that the timing and time duration of these packets can vary based on the packet size and based on the data rate that is employed and that these packets are not drawn to scale from a timing perspective and are meant, rather, to illustrate the juxtaposition of these packets with respect to each other and with respect to the WPAN and WLAN time interval set forth herein. In the example presented above, BT HV3 packets are employed, however, other packet formats such as eSCO, A2DP, MP3, etc, could likewise be used in a similar fashion.

In some instances, the WPAN may not be in operation and the coexistence management module 175 may not need to allocate separate time intervals for use by the WPAN. In these circumstances, the wireless interface schedule can be determined based on a use status of the network devices that are present and active, allocating all of the time slots to the WLAN if the WPAN is not in use.

Figure 7:
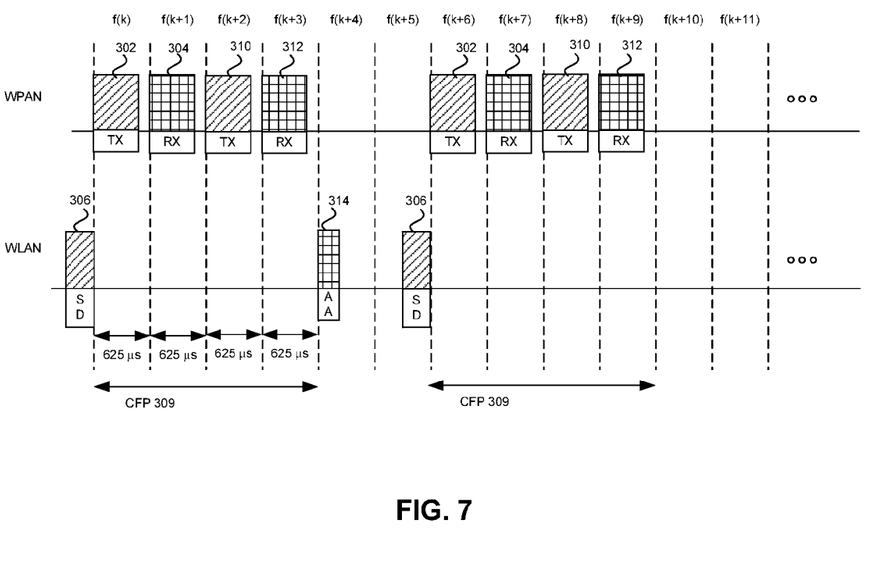
FIG. 7 is a timing diagram that illustrates an exemplary communication of Bluetooth HV3 frames and IEEE 802.11 transmissions, in accordance with an embodiment of the invention.

FIG. 7 is a timing diagram that illustrates an exemplary communication of WPAN transmissions and WLAN transmissions, in accordance with an embodiment of the invention. This timing diagram is similar to the timing diagram presented in FIG. 6 with similar elements represented by common reference numerals. In this embodiment however, contention free periods 309 have been established with WPAN slots allocated to two different devices. In this fashion, external device has been allocated the slots corresponding to communications 302 and 304 and another WPAN device has been allocated slots in the wireless interface schedule corresponding to communications 310 and 312.

In this embodiment, coexistence management module 175 is implemented in an access point that receives an IEEE 802.11 transmission 314 from another device that wishes to associate with the access point. This association attempt 314 includes a request for additional BT slots for this other device. Coexistence management module 175 cannot allocate any additional BT slots to the new device that wishes to associate because, for instance, it has reserved the time slots f(k+4), f(k+5), f(k+10), f(k+11) etc for IEEE 802.11 transmissions. When the coexistence management module 175 determines there is a lack of available BT slots it can either allow the association of this new device but indicate that no BT slots are available (not allocate BT slots to the new device). Alternatively, the coexistence management module 175 can instruct the access point to deny the request to associate with the access point based on the lack of available BT slots.

Figure 8:
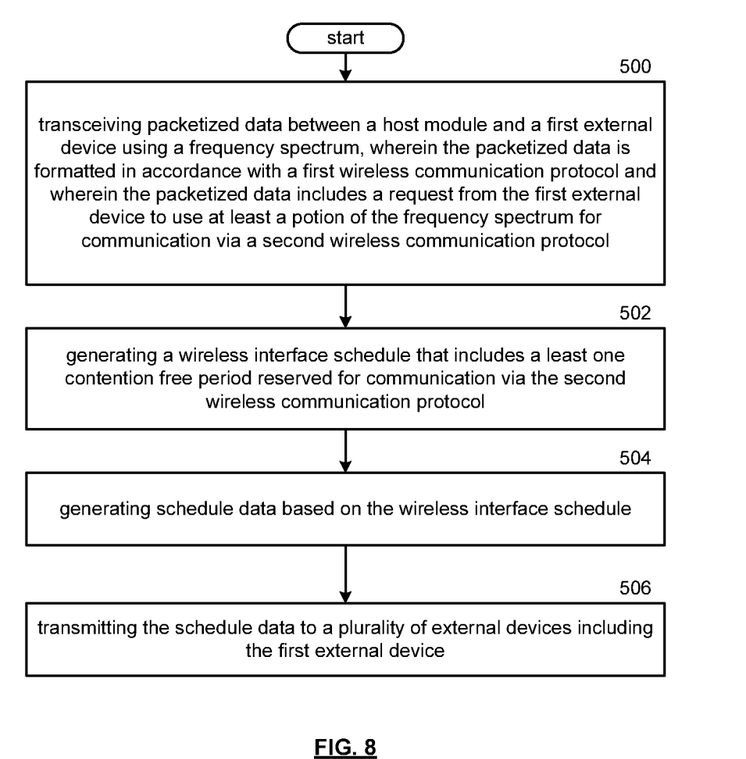
FIG. 8 is a flowchart representation of a method in accordance with an embodiment of the present invention.

FIG. 8 is a flowchart representation of a method in accordance with the present invention. In particular, a method is presented for use in conjunction with one or more functions and features described in conjunction with FIGS. 1-7. In step 500, packetized data is transceived between a host module and a first external device using a frequency spectrum, wherein the packetized data is formatted in accordance with a first wireless communication protocol and wherein the packetized data includes a request from the first external device to use at least a portion of the frequency spectrum for communication via a second wireless communication protocol. In step 502, a wireless interface schedule is generated that includes a least one contention free period reserved for communication via the second wireless communication protocol. In step 504, schedule data is generated based on the wireless interface schedule. In step 506, the schedule data is transmitted to a plurality of external devices including the first external device.

In an embodiment of the present invention, step 502 includes dividing the contention free period into a plurality of slots, and allocating use of at least one of the plurality of slots to the first external device in response to the request. Step 506 can transmit schedule data via at least one payload of the packetized data. The schedule data can instruct the plurality of external devices not to transmit via the first wireless communication protocol during the contention free period. The schedule data can include a network allocation vector and timing data, such as a timing synchronization function. The first wireless communication protocol can be a WLAN protocol and the second wireless communication protocol includes a WPAN protocol.

Figure 9:
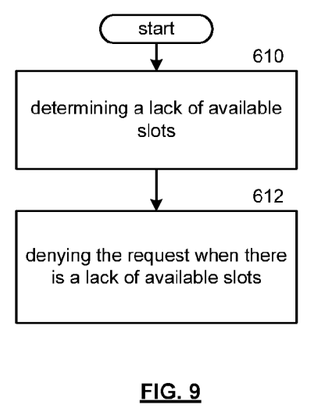
FIG. 9 is a flowchart representation of a method in accordance with an embodiment of the present invention.

FIG. 9 is a flowchart representation of a method in accordance with the present invention. In particular a method is presented for use in conjunction with one or more functions and features described in conjunction with FIG. 8. In step 610, a lack of available slots is determined. In step 612 the request is denied when there is a lack of available slots.

Figure 10:
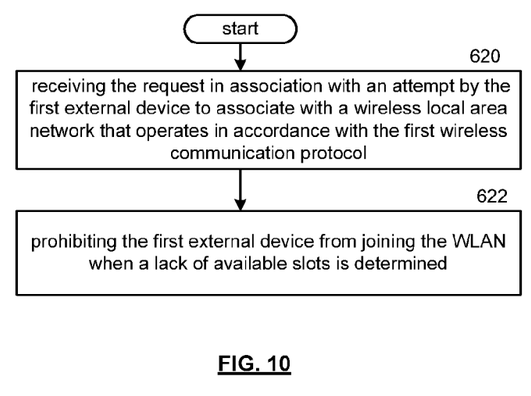
FIG. 10 is a flowchart representation of a method in accordance with an embodiment of the present invention.

FIG. 10 is a flowchart representation of a method in accordance with the present invention. In particular a method is presented for use in conjunction with one or more functions and features described in conjunction with FIG. 8. In step 620 the request can be received in association with an attempt by the first external device to associate with a wireless local area network that operates in accordance with the first wireless communication protocol. In step 622, the first external device can be prohibited from joining the WLAN when a lack of available slots is determined.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As one of average skill in the art will appreciate, other embodiments may be derived from the teachings of the present invention without deviating from the scope of the claims.

What is claimed is:

1. A circuit comprises:
    a first wireless interface circuit that transceives packetized data between a host module and a first external device using a frequency spectrum, wherein the packetized data is formatted in accordance with a first wireless communication protocol and wherein the packetized data includes an indication that the first external device in configured to use at least a portion of the frequency spectrum for communication via a second wireless communication protocol;
    a coexistence management module, coupled to the first wireless interface circuit, that generates a wireless interface schedule that includes a least one contention free period reserved for communication via the second wireless communication protocol, and that generates schedule data, based on the wireless interface schedule, for transmission to a plurality of external devices including the first external device.

2. The circuit of claim 1 wherein the coexistence management module divides the contention free period into a plurality of slots and that allocates use of at least one of the plurality of slots to the first external device via the second communication protocol.

3. The circuit of claim 2 wherein the coexistence management module determines a lack of available slots and that does not allocate at least one of the plurality of slots for communication via the second communication protocol when there is a lack of available slots.

4. The circuit of claim 2 wherein the first wireless interface circuit and the coexistence management module are implemented as part of an access point of a wireless local area network (WLAN) that operates in accordance with the first wireless communication protocol.

5. The circuit of claim 4 wherein the access point prohibits the first external device from joining the WLAN when the coexistence management module determines a lack of available slots.

6. The circuit of claim 1 wherein the coexistence management module generates schedule data for transmission to the plurality of external devices via at least one payload of the packetized data.

7. The circuit of claim 1 wherein the first wireless interface circuit and the coexistence management module are implemented as part of a station of a wireless local area network (WLAN) that operates in accordance with the first wireless communication protocol.

8. The circuit of claim 1 wherein the schedule data instructs the plurality of external devices not to transmit via the first wireless communication protocol during the contention free period.

9. The circuit of claim 8 wherein the schedule data includes a network allocation vector.

10. The circuit of claim 1 wherein the schedule data includes timing data.

11. The circuit of claim 10 wherein the timing data includes a timing synchronization function.

12. The circuit of claim 1 wherein the second wireless communication protocol includes a personal area network protocol.

13. A method comprising:
    transceiving packetized data between a host module and a first external device using a frequency spectrum, wherein the packetized data is formatted in accordance with a first wireless communication protocol and wherein the packetized data includes an indication that the first external device is configured to use at least a portion of the frequency spectrum for communication via a second wireless communication protocol;
    generating a wireless interface schedule that includes a least one contention free period reserved for communication via the second wireless communication protocol;
    generating schedule data based on the wireless interface schedule; and
    transmitting the schedule data to a plurality of external devices including the first external device.

14. The method of claim 13 wherein the step of generating the wireless interface schedule includes:
    dividing the contention free period into a plurality of slots; and
    allocating use of at least one of the plurality of slots to the first external device in response to the indication.

15. The method of claim 14 further comprising;
    determining a lack of available slots; and
    denying the indication when there is a lack of available slots.

16. The method of claim 14 further comprising:
    receiving the indication in association with an attempt by the first external device to associate with a wireless local area network that operates in accordance with the first wireless communication protocol.

17. The method of claim 16 further comprising;
    prohibiting the first external device from joining the WLAN when a lack of available slots is determined.

18. The method of claim 13 wherein the step of transmitting schedule data transmits schedule data via at least one payload of the packetized data.

19. The method of claim 13 wherein the schedule data instructs the plurality of external devices not to transmit via the first wireless communication protocol during the contention free period.

20. The method of claim 19 wherein the schedule data includes a network allocation vector.

* * * * *

UNITED STATES PATENT AND TRADEMARK OFFICE
CERTIFICATE OF CORRECTION

| | | |
|---|---|---|
| PATENT NO. | : 8,576,793 B2 | Page 1 of 1 |
| APPLICATION NO. | : 13/153111 | |
| DATED | : November 5, 2013 | |
| INVENTOR(S) | : Mahesh Iyer et al. | |

It is certified that error appears in the above-identified patent and that said Letters Patent is hereby corrected as shown below:

In the Claims
Col. 15, line 29, in claim 1: replace "device in" with --device is--
Col. 16, line 29, in claim 13: replace "includes a" with --includes at--

Signed and Sealed this
Twenty-second Day of July, 2014

Michelle K. Lee
*Deputy Director of the United States Patent and Trademark Office*